United States Patent [19]

Henderson et al.

[11] 4,134,070
[45] Jan. 9, 1979

[54] MODULAR RADIO

[75] Inventors: Claude L. Henderson, Camby; Edmund L. Abner, Indianapolis, both of Ind.

[73] Assignee: General Aviation Electronics, Inc., Indianapolis, Ind.

[21] Appl. No.: 870,678

[22] Filed: Jan. 19, 1978

Related U.S. Application Data

[63] Continuation-in-part of Ser. No. 784,161, Apr. 4, 1977, abandoned.

[51] Int. Cl.² ............................................. H01B 1/38
[52] U.S. Cl. ...................................... 325/15; 325/312; 325/355
[58] Field of Search ................... 325/15, 16, 312, 353, 325/355, 361

[56] References Cited

U.S. PATENT DOCUMENTS

| | | | |
|---|---|---|---|
| 2,731,555 | 1/1956 | Beck | 325/15 |
| 2,771,559 | 11/1956 | Montmeat | 307/156 |
| 2,771,560 | 11/1956 | Creiman | 307/156 |
| 3,059,184 | 10/1962 | Germain | 325/312 |
| 3,091,736 | 5/1963 | Germain | 325/355 |
| 3,272,920 | 9/1966 | Meurer | 358/139 |
| 3,449,749 | 6/1969 | McEvoy | 343/113 |
| 3,757,218 | 9/1973 | Oliverio et al. | 324/156 |
| 3,970,782 | 7/1976 | Fenne | 325/353 |
| 3,984,161 | 10/1976 | Johnson | 312/7 R |

Primary Examiner—Robert L. Griffin
Assistant Examiner—Michael A. Masinick
Attorney, Agent, or Firm—Woodard, Weikart, Emhardt & Naughton

[57] ABSTRACT

A modular radio, adapted for different mounting orientations and thereby suitable for use on a variety of water and air crafts. One embodiment pertaining to marine radios includes a head which is removable from the main body and a control panel which is detachable from the head. The main body can be secured within the vessel at virtually any height by means of a U-shaped bracket. When the radio is approximately waist high, the head and control panel are arranged so that the controls read left to right and are in an upwardly-facing orientation, normal to the user's line of sight. When the radio is mounted overhead, the head and control panel are arranged so that the controls read left to right and are in a downwardly-facing orientation, normal to the user's line of sight. The head and main body are adapted to be mounted to the vessel separately from one another. Another embodiment, pertaining to aviation radios, includes a converter indicator which is removable from the main body portion. The converter indicator is able to mounted separately from the main body portion so that the converter indicator can be positioned directly in front of the pilot when cockpit space is not available to mount the entire radio directly in front of the pilot.

12 Claims, 14 Drawing Figures

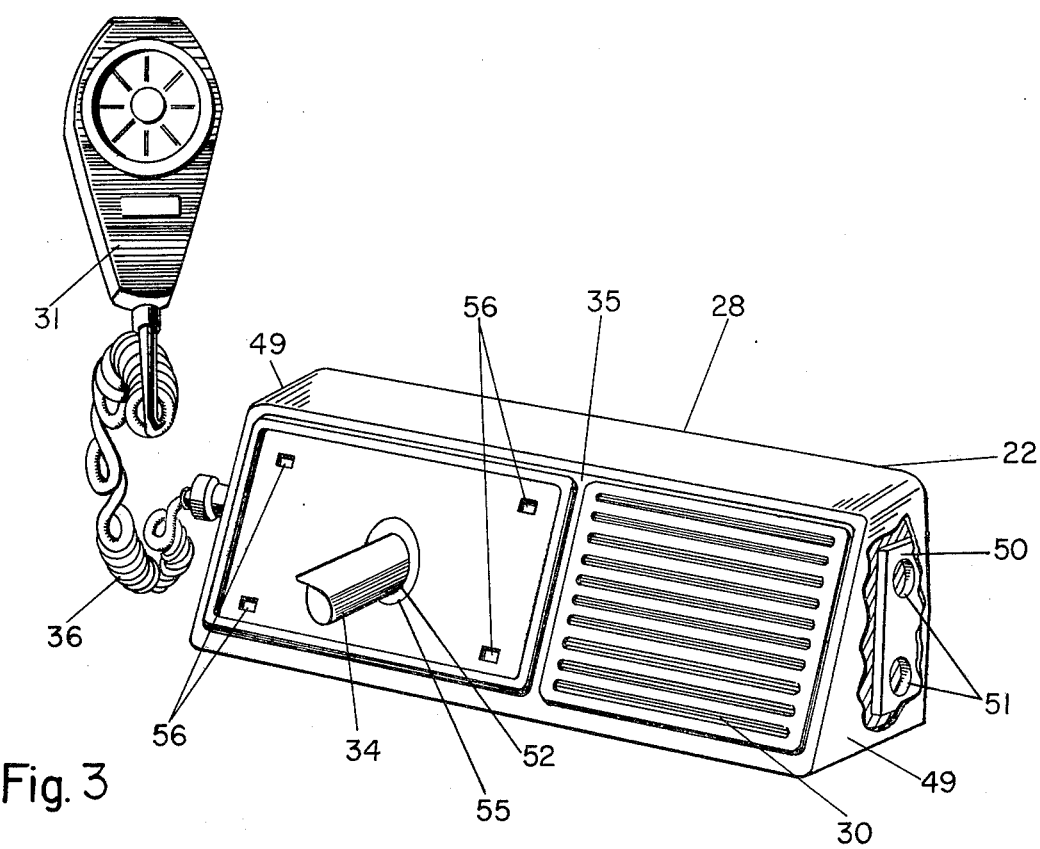
Fig. 3
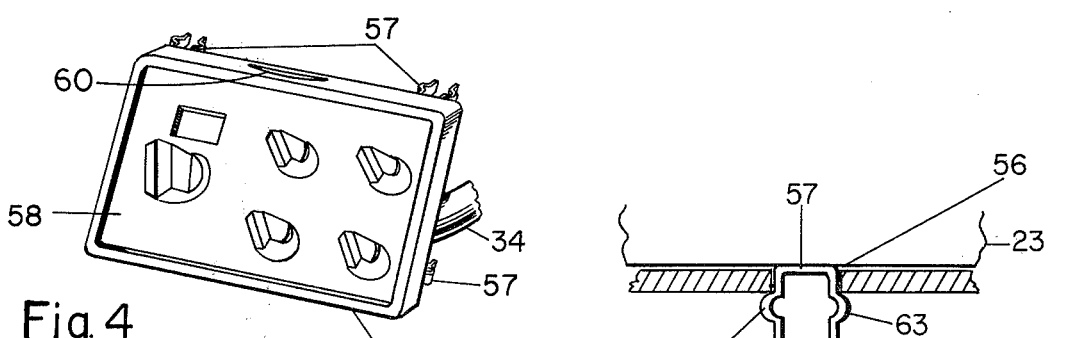
Fig. 4
Fig. 4a
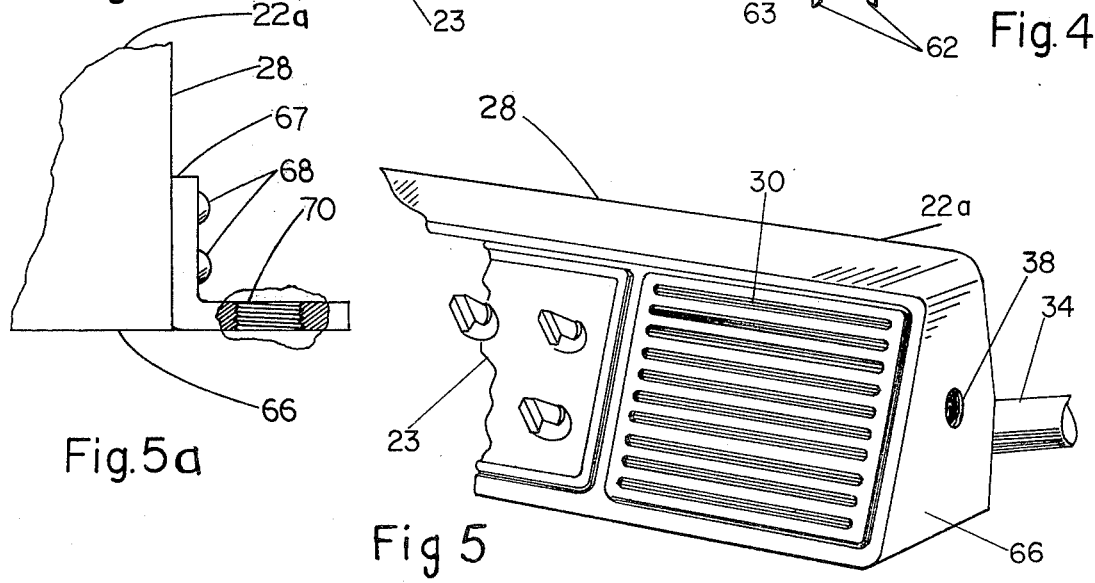
Fig. 5a
Fig 5

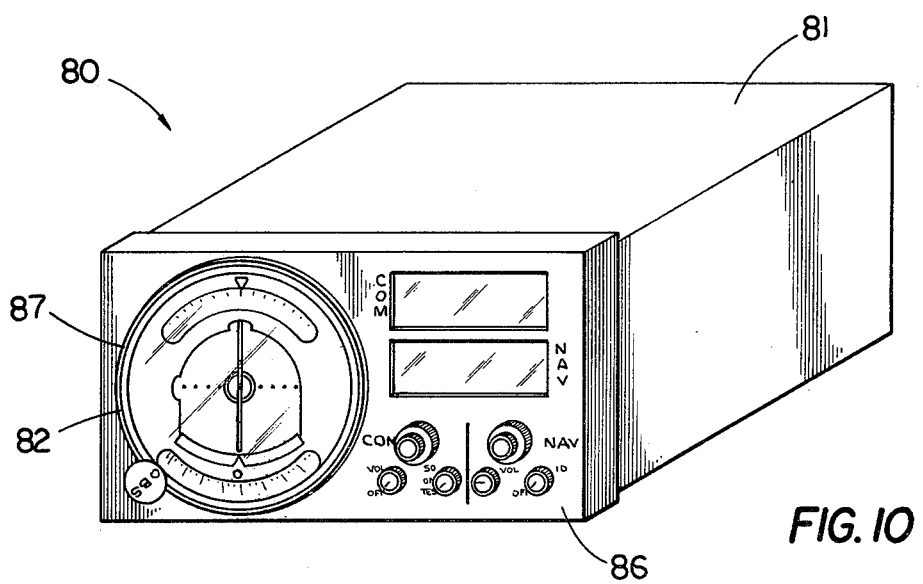
FIG. 10
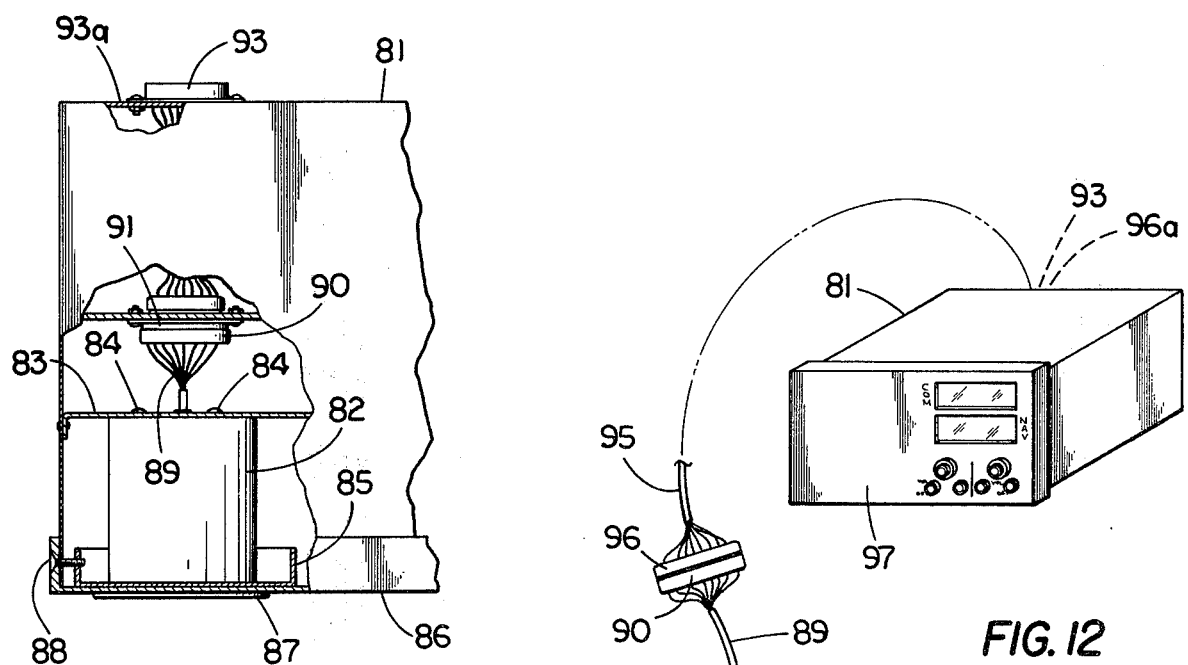
FIG. 11
FIG. 12

MODULAR RADIO

REFERENCE TO RELATED APPLICATION

This application is a continuation-in-part of our U.S. patent application, Ser. No. 784,161 filed Apr. 4, 1977, now abandoned.

BACKGROUND OF THE INVENTION

1. Field of the Invention

This invention relates in general to radios and more particularly to marine and aviation radios.

2. Description of the Prior Art

There are numerous styles of marine and aviation radios which incorporate different circuitry for different transmitting and receiving requirements. Such marine radios are usually mounted at or near the operator's steering and engine controls. Since the operator may be directing the vessel while radioing communications, it is important that human engineering factors be taken into consideration when such radios are designed. Consequently, most marine radios have controls which are positioned and spaced from each other so that they can be easily manipulated and read. The controls are often on a control panel which is inclined at an angle such that the user's line of sight is normal to the front surface of the control panel. One disadvantage with such marine radios is that with only one method for mounting the radio to the vessel, the different mounting structures and arrangements on different vessels cannot be accommodated by a single radio. Therefore, if a radio is designed so that its control panel will be upwardly facing, toward the user, when the radio is mounted approximately waist high, such a radio will not be suitable for overhead mounting. In the event such a radio is mounted above the head of the user, the controls would be facing up and away from, rather than toward the user, and these controls would be difficult to read. Additional problems occur when there is not sufficient space provided, depth-wise, to allow the radio to be recessed when mounted. It is inconvenient, if not dangerous, for a radio to protrude too far out into the open area of the cabin where it would be subject to being struck and possibly damaged.

Some patents which have come to my attention in connection with such devices are as follows:

| Patent No. | Inventor | Issue Date |
|---|---|---|
| 3,970,782 | Fenne | 7/20/76 |
| 3,091,736 | Germain | 5/28/63 |
| 2,731,555 | Beck | 1/17/56 |

Fenne discloses a modular control panel for an audio-visual receiving apparatus wherein there are two panelboards, one for frequently used controls and the other for occasionally used controls. The modular control panel may be retained in either of two positions so that either panelboard may be oriented in a displaying position.

Germain discloses a two-way radio communication unit wherein the control head and speaker may be detached and mounted separately from the main unit while remaining electrically coupled thereto. There are no provisions for different mounting arrangements for the control head to be oriented so as to face the user's line of sight.

Beck discloses a radio communication unit which is mountable on vehicles, such as automobiles, in a number of different positions. Although detachable modular units are disclosed, as with Germain, the location of the user relative to the facing direction of the control panel is not taken into consideration when the control panel is mounted in these different locations.

The design of aviation radios, such as navigation/communication radios, is complicated by the fact that cockpit space is at a premium. Although it is desirable that the converter-indicator be mounted directly in front of the pilot, there is often insufficient space to mount the entire NAV/COM radio at that location. When the converter-indicator is not directly in front of the pilot, parallax error of the converter-indicator reading can occur as well as requiring the pilot to turn his head in order to take a reading. Certain NAV/COM radios have been designed wherein the converter-indicator is constructed as a self-contained unit separate from the remainder of the radio. The disadvantage with this type of design is that the converter-indicator and the radio must be individually packaged, a factor which contributes to higher cost. Furthermore, these units must be individually mounted which may be an added inconvenience for those cockpits where space is available to mount the entire radio-converter-indicator package.

The following list of patents gives some indication of modular electronic package designs which have been conceived both for communication equipment and for other devices:

| Patent No. | Patentee | Issue Date |
|---|---|---|
| 2,771,559 | Montmeat | 11/20/56 |
| 2,771,560 | Creiman | 11/20/56 |
| 2,272,920 | Meurer | 9/13/66 |
| 3,449,749 | McEvoy | 6/10/69 |
| 3,757,218 | Oliverio et al. | 9/04/73 |
| 3,984,161 | Johnson | 10/05/76 |

Montmeat discloses a portable clock radio wherein the clock and power supply are provided in one self-contained unit and a battery powered receiver is provided as a second self-contained unit.

Creiman discloses a combination switch and interlock for electrical devices whereby it is possible to electrically and mechanically attach together electrical devices mounted in separate housings.

Meurer discloses a portable television receiver including a modular measuring device wherein the measuring device may be either a field strength measuring instrument or a radio adapter for VHF reception.

McEvoy discloses an electromagnetic surveillance system designed to receive and analyze electromagnetic radiation wherein there are four modular electronic packages one each for acquisition, control, analysis and recording.

Oliverio et al. discloses an electronic instrument for testing such characteristics as resistance and voltage wherein the test probe fits within a compartment and is removable therefrom while remaining electrically coupled to the electronics of the instrument housing.

Johnson discloses a mobile communication console for two-way radio equipment wherein a modular concept for the various pieces of equipment is used for the purposes of installation convenience and to facilitate repair and replacement.

Although each of these various patents discloses a type of separately packaged modular construction for electronic equipment, none of the patents disclose a type of device wherein the one modular unit is specifically designed to be both mounted as an integral part of the main unit for one style of installation and to be mounted separately from the main unit for a different style of installation.

SUMMARY OF THE INVENTION

A modular radio according to one embodiment of the present invention might comprise a radio which is able to be oriented in either an upwardly-facing or a downwardly-facing position and include a main body, a removable head, a detachable control plate and a cable. The main body has a front panel and means for mounting the main body within a conveyance. The removable head has an inclined front surface and is attachable to the main body in one of two positions wherein the front surface is inclined upwardly in one position and is inclined downwardly in the other position. The detachable control plate is attachable to the removable head in either of the described positions. The cable electrically connects the circuitry of the main body to the detachable control plate.

An alternate form of the presnt invention might include a radio of the type described in which the removable head has means for securing the head within a conveyance separate from the main body.

An aviation radio according to another embodiment of the present invention includes a main unit and a removable converter-indicator which can be mounted separately from the main unit.

One object of the present invention is to provide an improved radio capable of different mounting arrangements.

Related objects and advantages of the present invention will be apparent from the following description.

BRIEF DESCRIPTION OF THE DRAWINGS

FIG. 3 is a perspective view of a head comprising a portion of the FIG. 1 marine radio.

FIG. 4 is a perspective view of a control plate comprising a portion of the FIG. 1 marine radio.

FIG. 4a is a detailed elevational view of a spring plug comprising a portion of the FIG. 1 marine radio.

FIG. 5 is a partial perspective view of a head comprising a portion of an alternate embodiment of the FIG. 1 marine radio.

FIG. 5a is a partial top view of the FIG. 5 head showing an alternate mounting means.

FIG. 10 is a perspective view of an aviation radio according to one embodiment of the present invention.

FIG. 11 is a partial fragmentary top view of the FIG. 10 radio.

FIG. 12 is a perspective view of a converter-indicator and a main body unit separate from each other comprising portions of the FIG. 10 radio.

DESCRIPTION OF THE PREFERRED EMBODIMENTS

Figure 1:
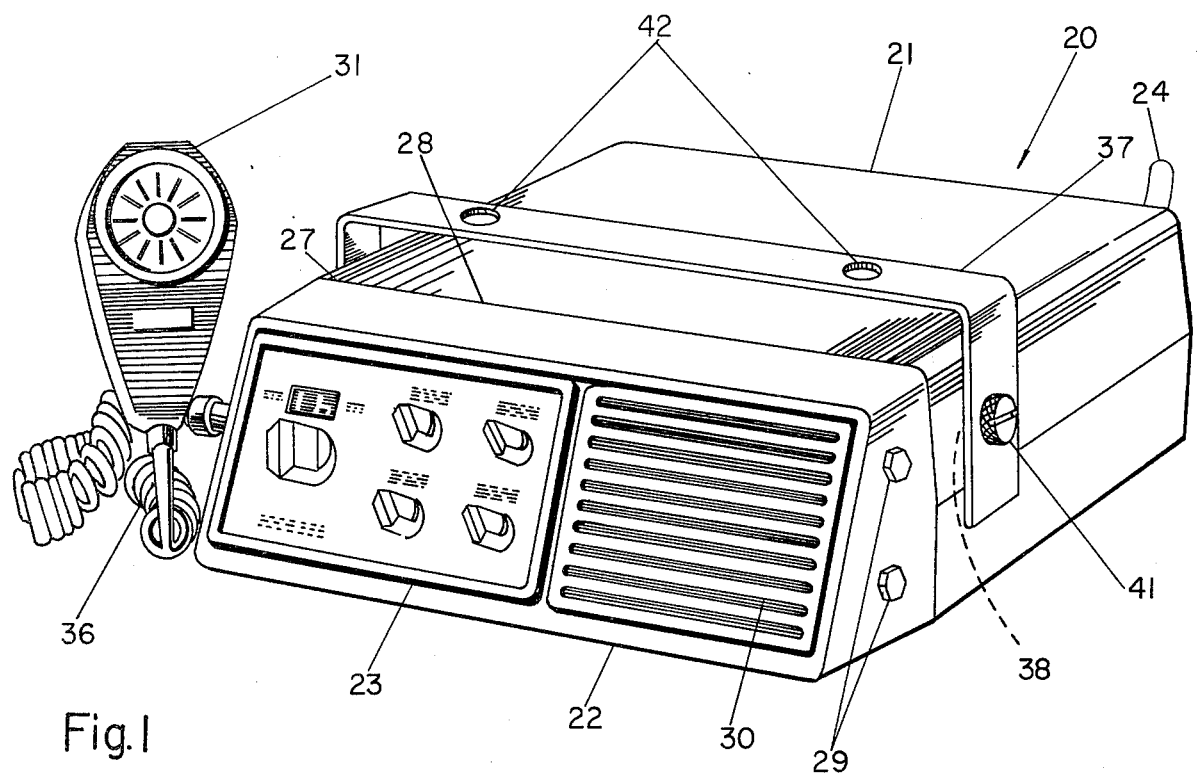
FIG. 1 is a perspective view of a marine radio according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a marine radio 20 comprising a main body 21, removable head 22 and detachable control plate 23. The main body 20 is a sealed enclosure which houses a majority of the radio circuit electronic components. Incoming power connects to the main body 21 by means of a cable 24. The detachable head 22 mechanically attaches to main body 21 by means of two arms (see FIG. 2) which extend outwardly from the front panel 27 of main body 21 and insert into recessed slots at the rear surface 28 of head 22. The head 22 is secured to these arms by threaded fasteners such as bolts 29. A second pair of bolts 29 are present on the opposite side of head 22, but are hidden from view due to the perspective angle of FIG. 1.

Removable head 22 comprises a speaker 30, microphone 31 and control plate 23. Control plate 23 which is removable from head 22 houses all the necessary controls for operating marine radio 20 such that the only required electrical or mechanical connection to the circuitry of main body 21 is by means of a cable 34 (see FIG. 2) which connects between control plate 23 and main body 21. Cable 34 exits from main body 21 through an opening in front panel 27 and passes through detachable head 22. The cable exits from head 22 by means of an opening in the front surface 35 of head 22. Although the majority of conductors within cable 34 are connected between the circuitry of the main body 21 and the controls of the control plate 23, two conductors branch out of cable 34 inside head 22. One of these two conductors connects to speaker 30 and the other conductor connects to microphone 31. Microphone 31 connects to head 22 by means of a coiled extension cable 36. Although not a part of the electrical operation of marine radio 20, a necessary mechanical component is U-shaped bracket 37 which permits the radio 20 to be mounted to some structural member or platform within the marine vessel in which the radio is used. Main body 21 has a pair of internally threaded inserts such as captive nuts 38 secured within the sides of main body 21. Bracket 37 is secured to main body 21 by means of screws 41 which are threadedly received by captive nuts 38. Inasmuch as the perspective angle of FIG. 1 hides the left side of radio 20, only one screw 41 and one captive nut 38 are indicated. The top surface of bracket 37 has a pair of openings 42 through which suitable mounting hardware can be inserted in order to secure bracket 37 to a structural member or platform to mount radio 20.

The controls and operation of marine radio 20 are representative of other marine radios. Inasmuch as such controls and operation are well known in the art, further details of the electrical features and operation are not thought necessary.

Figure 2:
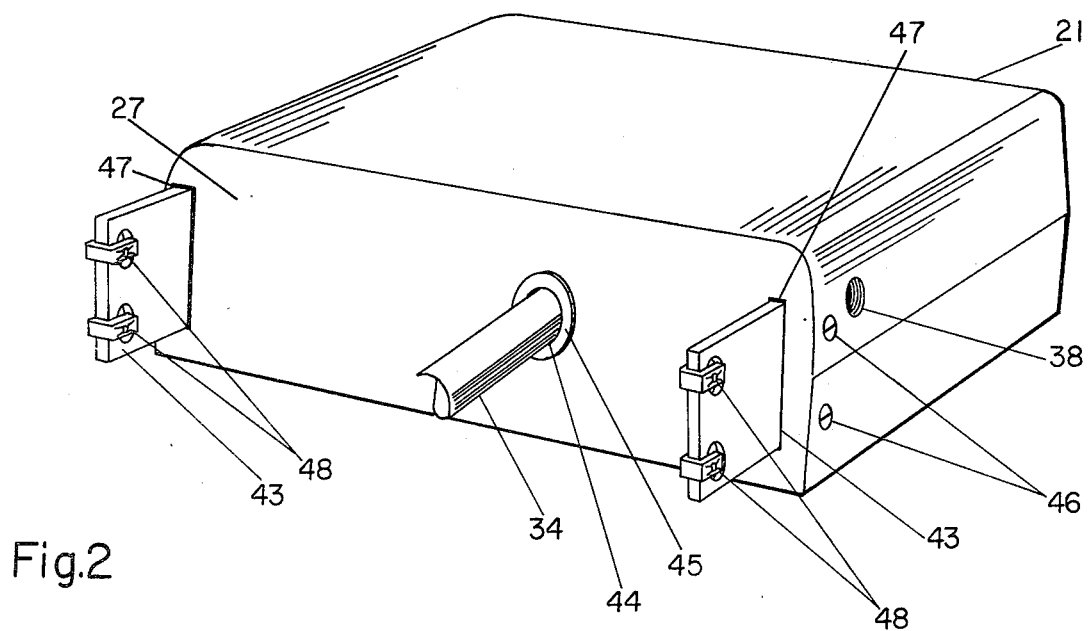
FIG. 2 is a perspective view of the main body comprising a portion of the FIG. 1 marine radio.

FIG. 2 is a perspective view of main body 21 showing the two arms 43, which insert into head 22, and cable 34 exiting from front panel 27 through opening 44. A synthetic grommet 45 is fitted within opening 44 and around cable 34 in order to protect cable 34 from being cut or abraded. Secured to the end of each arm 43 are a pair of internally threaded, clip-type nuts 48. Each nut 48 fits over a vertical slot in the end of arm 43 and each nut 48 can be moved up or down so as to align with openings in the sides of head 22 for receipt of bolts 29 (see FIG. 1). Each arm 43 fits within a recessed area 47 in face 27 and is attached to the corresponding side wall of main body 21 by means of flathead screws 46. These screws 46 will be drawn flush with the outer surface of main body 21 and consequently screws 46 will not interfere with the attaching of bracket 37. The use of screws 46 also allows arms 43 to be removed when head 22 is not attached to main body 21 as will be discussed later. On each side of main body 21 is a captive nut 38 for attachment to bracket 37.

FIG. 3 is a perspective view of head 22 removed from main body 21 and from which plate 23 has been detached. Each side panel 49 of head 22 has a recessed slot 50 which is sized and positioned to receive arm 43. Once arm 43 is fully inserted into recessed slot 50, the clip-type nuts 48 on arm 43 will be aligned with openings 51, which extend through side panel 49 into slot 50, such that bolts 29 can be inserted to threadedly secure the head 22 to the main body 21. When the head 22 is secured to the main body 21, rear surface 28 will fit against front panel 27 as shown in FIG. 1.

Front surface 35 is inclined at an angle relative to rear surface 28 such that in the FIG. 3 orientation, front surface 35 faces upwardly. Due to the symmetrical arrangement of arms 43, nuts 48, slot 50 and openings 51; head 22 can be secured to main body 21 as shown in FIG. 1 or head 22 can be removed rotated 180 degrees in either a clockwise or counterclockwise direction generally in the plane of FIG. 3, and then reattached to main body 21. When rotated as described, front surface 35 will still be inclined relative to rear surface 28, but front surface 35 will be facing downwardly. These two alternative positions, facing upwardly or facing downwardly for head 22, will be discussed in greater detail later.

Cable 34 exits from front surface 35 through opening 52. A synthetic grommet 55 is fitted within opening 52 and around cable 34 similar to the configuration on front panel 27 as has previously been described. Four spring-plug openings 56 are employed as part of front surface 35 such that control plate 23 can be detached and reattached easily by the use of spring plugs 57 (see FIG. 4) without the need for threaded fasteners or brackets. The connection of spring plugs 57 into openings 56 is shown in greater detail in FIG. 4a.

FIG. 4 is perspective view of control plate 23 detached from head 22 and showing cable 34 and spring plugs 57. There are four such plugs 57, one at each corner of plate 23, which are designed to snap into openings 56 for securing control plate 23 into head 22. The symmetrical spacing of openings 56 and spring plugs 57 is such that control plate 23 will attach to head 22 whether head 22 is positioned as shown in FIG. 1 or if rotated 180 degrees as previously described. The control side 58 of control plate 23 has controls which read left to right, and regardless of the orientation of head 22 (upwardly facing or downwardly facing), the position of the controls must be compatible for left to right reading by the user. Consequently, when the head 22 is upwardly facing, as in FIG. 1, the control plate will be oriented as shown in FIG. 4. If the head 22 is rotated 180 degrees, control plate 23 must be removed from head 22 and then reinstalled, maintaining its same top-to-bottom and left-to-right reading orientation. In this way, the controls of control plate 23 will continue to read left to right when snapped into head 22 whether head 22 is upwardly facing or downwardly facing. Part-circular depression 60 positioned in the top edge of control plate 23 is approximately 0.75 inches long and 0.10 inches deep. This depression serves as a means to grip or pry control plate 23 when detaching plate 23 from head 22.

FIG. 4a is a detailed view showing the mechanical connection between one opening 56 and one spring plug 57. As spring plug 57 is inserted into opening 56, there will be a clearance between the ends 62 of plug 57 and the sides of opening 56 until raised heads 63 are encountered. Continued pushing on control plate 23 will apply a force on heads 63 thereby causing the ends 62 of plug 57 to close together and allowing heads 63 to clear the sides of opening 56 and for plug 57 to be inserted. Once heads 63 pass through opening 56, ends 62 spring back in an outward direction positioning heads 63 behind opening 56 and locking plug 57 into opening 56.

FIG. 5 is a partial perspective view of head 22a showing a captive nut 38 recessed into side panel 66. Head 22a represents an alternate form of head 22 with the noted difference that head 22a mounts to some structural member of the vessel rather than mounting to main body 21. Consequently, the main body 21a used with head 22a will not have arms 43 or nuts 48. Similarly, head 22a will not have recessed slots 50 or openings 51. Cable 34 connects the main body 21a circuit components to the control plate 23 as before, but head 22a is mounted separately from the main body and therefore cable 34 may need to be longer in order to connect between the two remote positions of the head and mian body. Although only one captive nut 38 is shown, there is another captive nut 38 on the opposite side panel 66, which aligns with the first nut in order to secure a bracket 37 to head 22a. The same type of bracket used to mount the main body 21 or 21a in FIG. 1 is used to mount head 22a inasmuch as the height and width of head 22a are virtually the same as main body 21a.

Captive nuts 38 and screws 41 are described as the means by which bracket 37 is secured to main body 21 (see FIG. 1) and a similar arrangement is employed when head 22a is mounted separately from the main body 21 or 21a. However, there are also other mounting arrangements for head 22a which are contemplated and which will permit the head to be mounted separately from the main body. One such arrangement is shown by FIG. 5a which is a partial top view of head 22a. FIG. 5a shows an L-shaped bracket 57 attached to the rear surface 28 of head 22a by means of screws 68. The rearwardly-extending portion of bracket 67 includes an internally threaded aperture 70 which receives a screw when bracket 37 is attached to head 22a by means of bracket 67. Another bracket 67 is attached to the opposite end of rear surface 28 and is properly spaced from the first bracket 67 to secure to bracket 37. In the event head 22a is to be attached to main body 21 or 21a, brackets 67 can be removed by removing screws 68.

The fact that arms 43 are removable from main body 21 means that a single main body and a single head could be constructed with arms 43, slots 50, openings 51 and captive nuts 38 such that a single main body would be suitable for both main body 21 and 21a configurations and a single head would be suitable for both head 22 and 22a configurations. If the head is mounted separately from main body 21, then the arms 43 would be removed from main body 21.

An important consideration in the design of manually operated devices, such as a marine radio, are the human engineering factors. It is desirable to have controls which can be easily read and easily operated. One factor to be considered is the orientation of the front panel controls relative to the line of sight of the user. The preferred arrangement is to have the line of sight of the user normal to the plane of the controls so that the controls can be easily read without parallax distortions. Therefore, marine radios which mount approximately waist high, should have controls facing upwardly and those radios which mount overhead should have controls facing downwardly. To achieve both of these arrangements, the present invention incorporates detachable and removable modular marine radio components which can be arranged in different orientations so that the line of sight can be either upwardly facing or downwardly facing, depending on the height at which the radio is mounted within the vessel.

Figure 6:
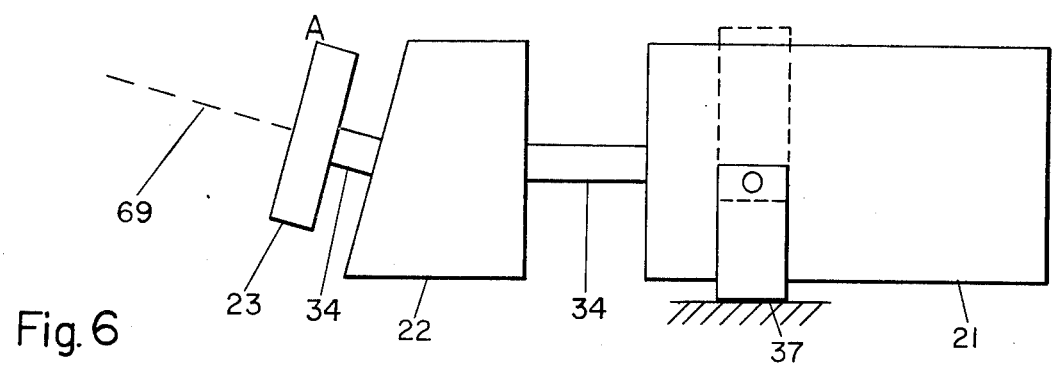
FIG. 6 is a block diagram of one arrangement of the components of the FIG. 1 marine radio.

FIGS. 6-9 are modular block diagrams representative of the radio components previously described and showing some of the various orientations which are possible with the marine radio which has been described. For FIGS. 6 and 7, it is to be understood that although the components are shown apart from each other, this is only for drawing clarity and the radio is a single connected unit. FIG. 6 shows an arrangement corresponding to FIG. 1 in which the main body 21, head 22, and control plate 23 comprise a single unit. The radio is mounted approximately waist high. Bracket 37 is shown as supporting the radio as would be the case if the radio were mounted on a platform. The dotted line orientation for bracket 37 represents the position of the bracket which was shown in FIG. 1 and which would be applicable if the radio is suspended from a structural member. The line of sight 69 is normal to the controls side of control plate 23 and is upwardly facing toward the user. Reference letter A designates the top of control plate 23 when plate 23 is in a position for reading the controls left to right. Regardless of the direction of the line of sight, the top of control plate 23 must be toward the top of the radio.

Figure 7:
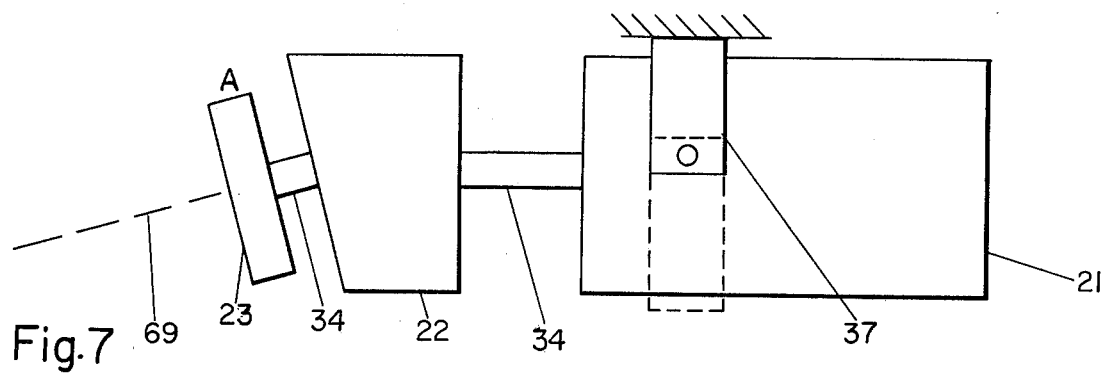
FIG. 7 is a block diagram of another arrangement of the components of the FIG. 1 marine radio.

FIG. 7 shows the FIG. 6 radio in which bracket 37 has been reversed and head 22 has been inverted so that the line of sight 69 is downwardly facing. This type of arrangement corresponds to situations in which the radio is mounted in an elevated position over the head of the user. Note that reference letter A is at the top, so that the controls are still left to right reading, even though control plate 23 is on the right side and speaker 30 is on the left side of head 22.

Figure 8:
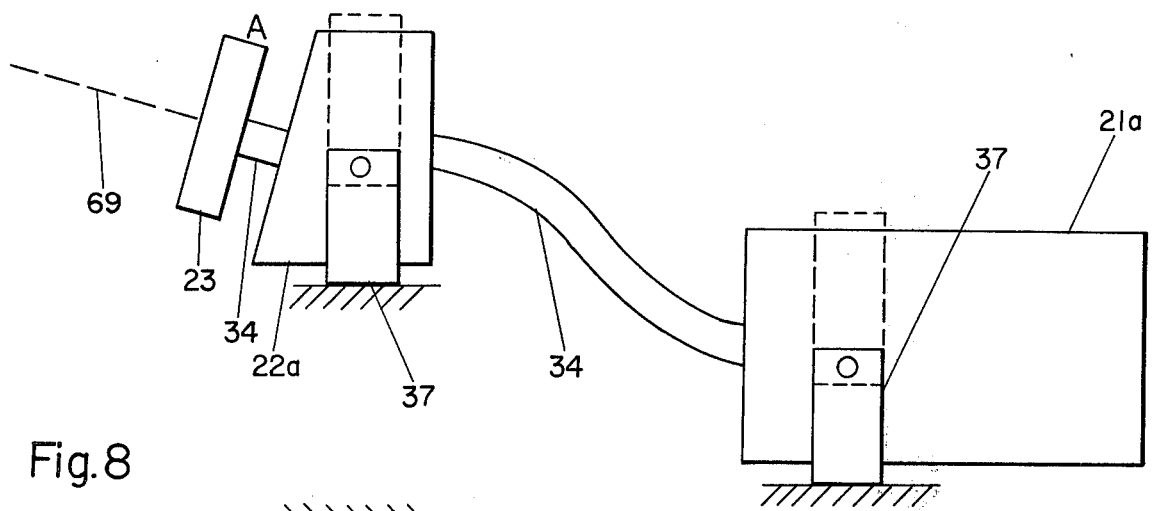
FIG. 8 is a block diagram of another arrangement of the FIG. 1 marine radio comprising the FIG. 5 head.
Figure 9:
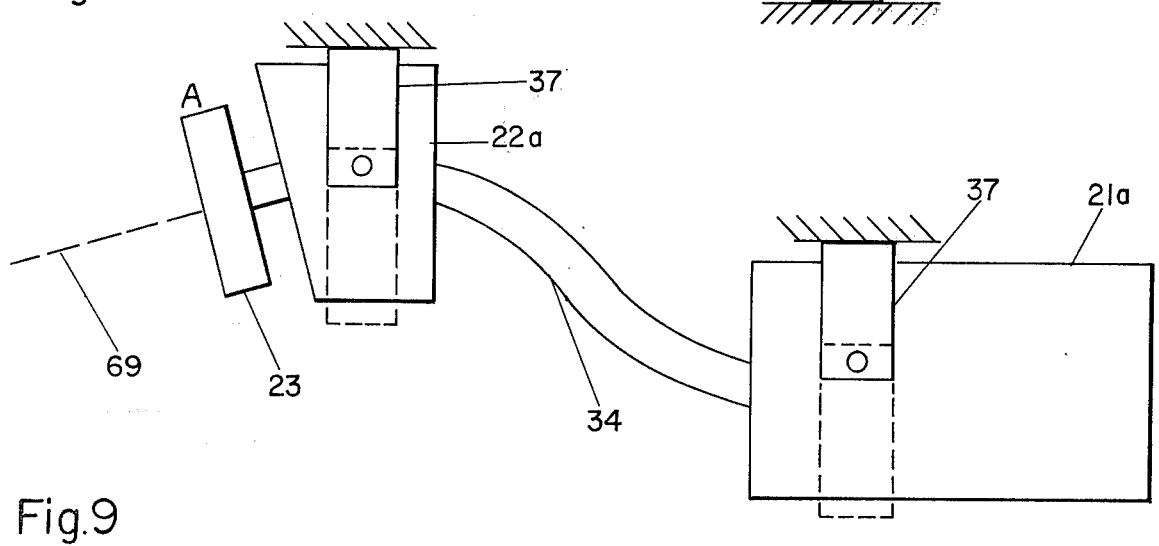
FIG. 9 is a block diagram of another arrangement of the FIG. 1 marine radio comprising the FIG. 5 head.

For FIGS. 8 and 9, the modular components are shown apart from each other and it is to be understood that control plate 23 and head 22a comprise a single unit which is mounted separately from main body 21a.

FIG. 8 shows an alternate form in which head 22a and main body 21a are mounted at remote locations from one another. Cable 34 connects between control plate 23 and the main body 21a and the length of the cable is determined by the extent of separation between head 22a and main body 21a. This type of arrangement is ideal when there is insufficient space to mount the radio as a single unit or where there is insufficient depth to prevent the radio from protruding too far into the cabin area of the vessel. Like FIG. 6, FIG. 8 represents a mounting position for the radio which is approximately waist high.

FIG. 9 shows the FIG. 8 radio in which bracket 37 has been reversed and head 22a has been inverted so that the line of sight 69 is downwardly facing. This type of arrangement corresponds to situations in which it is desirable to have the head portion mounted over the head of the user. Note that reference letter A is at the top in both FIGS. 8 and 9 so that the controls are still left to right reading, and as in FIG. 7, control plate 23 is to the right of speaker 30.

It should be noted that a further mounting combination exists, that being when the head is at one elevation and the main body is at a different elevation. This would allow the head to be positioned overhead while the main body is waist high and vice versa.

Referring to FIGS. 10, 11 and 12, there is illustrated an aviation radio 80 having navigation and communication modes which include main body portion 81 and removable converter-indicator 82. Aviation radio 80 is oriented as it would be when in use in the cockpit of an airplane and mounted as a single, self-contained unit. However, there is often insufficient space in the cockpit area to be able to mount the radio as a single, self-contained unit in a location directly in front of the pilot, even though such a mounting location is desirable so that the converter-indicator can be easily read without parallax error.

There is, however, a plurality of circular openings in the dashboard area directly in front of the pilot and one such opening could be used to mount the converter-indicator 82 if it is detachable from the main body portion 81 of the aviation radio 80. Consequently, one feature of aviation radio 80 is that the converter-indicator 82 has dual mounting provisions which permit it to be mounted within main body portion 81 as a single unit as well as mounted separate from main body portion 81 into one of the circular openings in the cockpit dashboard.

When mounted as part of main body portion 81, converter-indicator 82 is attached to a cross member 83 by means of threaded fasteners 84. Converter-indicator 82 has a generally square flange portion 85 which abuts the rear surface of front panel 86. Converter-indicator 82 also has a generally circular raised portion 87 which is positioned flush to slightly raised relative to the outer surface of front panel 86. Within one side of flange portion 85 is a plurality of internally threaded holes which are used to further secure converter-indicator 82 into position by means of threaded fasteners 88. Extending from the rear of converter-indicator 82 are a wire pigtail 89 and a multipin connector 90. The mating multipin connector 91, for connector 90, is mounted to a circuit board 92 internal to main body portion 81. Also included as part of main body portion 81 is another multipin connector 93 which is mounted to the rear surface of enclosing cabinet 93a and whose function will be described hereinafter. In this self-contained, single unit configuration, the entire aviation radio 80 is arranged for mounting in a 6-½ inch wide standard rack having 6-inch bolt center spacing which is typical of most aircraft cockpits.

When it is desired to mount converter-indicator 82 into one of the circular openings of the cockpit dashboard which are directly in front of the pilot, the following procedure is followed. The radio technician who is authorized to perform aviation radio installations and repairs must first remove threaded fasteners 88 and then remove front panel 86 from main body portion 81. Next, threaded fasteners 84 are removed, connectors 90 and 91 are disconnected and converter-indicator 82 is pulled from the main body portion 81. Each circular opening in the cockpit dashboard has a surrounding hole pattern. These holes may either be internally threaded or include a staked nut. Corresponding to this particular hole pattern are three clearance holes 94 (see FIG. 12) in flange portion 85 and depending upon the particular aircraft design, converter-indicator 82 may be inserted into the selected circular opening either from the front or from the rear of the dasboard and threaded fasteners extend through holes 94 into the internally threaded holes (or staked nuts) surrounding the circular opening, thereby securely mounting the converter-indicator into the dashboard.

The electrical connection between the remote locations of converter-indicator 82 and main body portion 81 is accomplished by means of an extension cable 95 which includes multipin connector 96 at one end and a similar connector 96a at the opposite end. As illustrated, connector 96 mates with connector 90 and connector 96a mates with connector 93. The connection between connectors 91 and 93 may be hard wired in as part of the main body portion 81 or may be jumpered together at the time converter-indicator 82 is removed and remotely mounted from main body portion 81. The final step is to replace front panel 86 with a new front panel 97 which is solid in the area where the converter-indicator 82 used to be located.

Thus, aviation radio 80 provides an inexpensive and versatile way to adapt a necessary item of aircraft equipment so that a variety of mounting configurations can be accommodated by means of the same basic unit.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A radio having operational controls which are able to be oriented in either an upwardly-facing or a downwardly-facing position which comprises:
   a main body having means for mounting said main body to a conveyance;
   a removable head having an inclined front surface and being attachable to said main body in one of two positions wherein said front surface is inclined upwardly in one position and is inclined downwardly in the other position;
   a detachable control plate having a controls side and being attachable to said removable head in one of two orientations wherein said controls side is upwardly facing in one orientation and is downwardly facing in the other orientation; and
   a cable electrically connecting said main body to said detachable control plate.

2. The radio of claim 1 in which the main body further comprises a pair of arms attachable to said detachable head.

3. The radio of claim 1 in which the mounting means comprises a bracket secured to said main body and attachable to the conveyance in one of two configurations wherein the radio is suspended from the bracket in one configuration and the radio is supported by the bracket in the other configuration.

4. The radio of claim 3 in which the main body further comprises a pair of arms attachable to said detachable head.

5. The radio of claim 4 in which said main body is constructed to enclose electrical circuit components.

6. The radio of claim 5 in which the detachable head includes a speaker and a microphone and the cable further connects the speaker and the microphone to the electrical circuit components within said main body.

7. A radio having operational controls which are able to be oriented in either an upwardly-facing or a downwardly-facing position which comprises:
   a main body having means for securing said main body within a conveyance;
   a removable head having an inclined front surface and means for mounting said removable head within a conveyance in one of two positions wherein said front surface is inclined upwardly in one position and is inclined downwardly in the other position;
   a detachable control plate having a controls side and being attachable to said removable head in one of two orientations wherein said controls side is upwardly facing in one orientation and is downwardly facing in the other orientation; and
   a cable electrically connecting said main body to said detachable control plate.

8. The radio of claim 7 in which the mounting means comprises a bracket secured to said main body and attachable to the conveyance in one of two configurations wherein the radio is suspended from the bracket in one configuration and the radio is supported by the bracket in the other configuration.

9. The radio of claim 7 in which the securing means comprises a bracket secured to said head and attachable to the conveyance in one of two configurations wherein the head is suspended from the bracket in one configuration and the head is supported by the bracket in the other configuration.

10. The radio of claim 9 in which the mounting means comprises a bracket secured to said main body and attachable to the conveyance in one of two configurations wherein the radio is suspended from the bracket in one configuration and the radio is supported by the bracket in the other configuration.

11. The radio of claim 10 in which said main body is constructed to enclose electrical circuit components.

12. The radio of claim 11 in which the detachable head includes a speaker and a microphone and the cable further connects the speaker and the microphone to the electrical circuit components within the main body.

* * * * *